United States Patent
Kim et al.

(10) Patent No.: US 8,081,227 B1
(45) Date of Patent: Dec. 20, 2011

(54) IMAGE QUALITY VISUAL INDICATOR

(75) Inventors: Grace Kim, San Mateo, CA (US);
Wilson Chan, San Jose, CA (US);
Sheryl Ehrlich, La Honda, CA (US)

(73) Assignee: Adobe Systems Incorporated, San Jose, CA (US)

( * ) Notice: Subject to any disclaimer, the term of this patent is extended or adjusted under 35 U.S.C. 154(b) by 457 days.

(21) Appl. No.: 11/607,302

(22) Filed: Nov. 30, 2006

(51) Int. Cl.
*H04N 5/232* (2006.01)
*H04N 5/225* (2006.01)

(52) U.S. Cl. .................... 348/211.3; 348/333.04

(58) Field of Classification Search ............. 348/333.04, 348/333.02, 333.11, 118, 211.2, 211.3
See application file for complete search history.

(56) References Cited

U.S. PATENT DOCUMENTS

| | | | | |
|---|---|---|---|---|
| 5,806,005 | A * | 9/1998 | Hull et al. | 348/14.12 |
| 6,018,397 | A * | 1/2000 | Cloutier et al. | 358/1.2 |
| 6,778,684 | B1 * | 8/2004 | Bollman | 382/112 |
| 7,286,177 | B2 * | 10/2007 | Cooper | 348/333.02 |
| 7,405,816 | B2 * | 7/2008 | Ojanen | 348/188 |
| 2003/0117511 | A1 * | 6/2003 | Belz et al. | 348/333.11 |
| 2003/0151674 | A1 * | 8/2003 | Lin | 348/222.1 |
| 2003/0185458 | A1 * | 10/2003 | Wang | 382/255 |
| 2004/0119990 | A1 * | 6/2004 | Miller et al. | 358/1.2 |
| 2005/0141021 | A1 * | 6/2005 | Ueda et al. | 358/1.15 |
| 2005/0219393 | A1 * | 10/2005 | Sugimoto | 348/333.01 |
| 2005/0219400 | A1 * | 10/2005 | Poulsen | 348/345 |
| 2005/0219666 | A1 * | 10/2005 | Ejima et al. | 358/539 |
| 2006/0017820 | A1 * | 1/2006 | Kim | 348/231.2 |
| 2006/0082672 | A1 * | 4/2006 | Peleg | 348/333.01 |
| 2006/0274145 | A1 * | 12/2006 | Reiner | 348/62 |

FOREIGN PATENT DOCUMENTS

JP     2004046591 A  *  2/2004

OTHER PUBLICATIONS

Halmshaw et al., Industrial Radiography, Image Quality Indicators in Industrial Radiography, 2001.
Jacobsen Real-Time X Ray Machinery Inc., Tutorial: Glossary of Terms, http//www.1877goxray1.com/company/glossary.shtml.com
Imatest-Sharpness, Sharpness: What is it and how is it measured?, http://www.imatest.com/docs/sharpness.html.

* cited by examiner

*Primary Examiner* — Jason Whipkey
(74) *Attorney, Agent, or Firm* — Van Pelt, Yi & James LLP (57) ABSTRACT

An image for which a quality indicator is to be displayed is obtained. The image is processed to obtain a quality value associated with the quality of the image. The quality indicator based at least in part on the quality value is displayed, wherein the quality indicator is displayed with a displayed version of the image.

20 Claims, 10 Drawing Sheets

IMAGE QUALITY VISUAL INDICATOR

BACKGROUND OF THE INVENTION

Oftentimes, digital cameras or other devices with digital camera capabilities (e.g., camera phones, PDAs, etc.) are relatively small devices with small screens and/or have low resolution. This can make determining the quality of an image difficult for a user. For example, a user may have to manually zoom in on part of the image, manually examine that portion, and then repeat the process on another section of the image. This process can be tedious and may be prone to error. For example, a user may think an image is acceptable at the moment of capture, but when the image is later printed (and especially when the image is blown up as a large print) or when the image is later viewed on a larger display, the user will realize that the image is slightly blurry or out of focus. It would be desirable if new techniques for assessing quality were developed for devices where a displayed image is relatively small and/or image quality is not easily discernable.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer program product such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
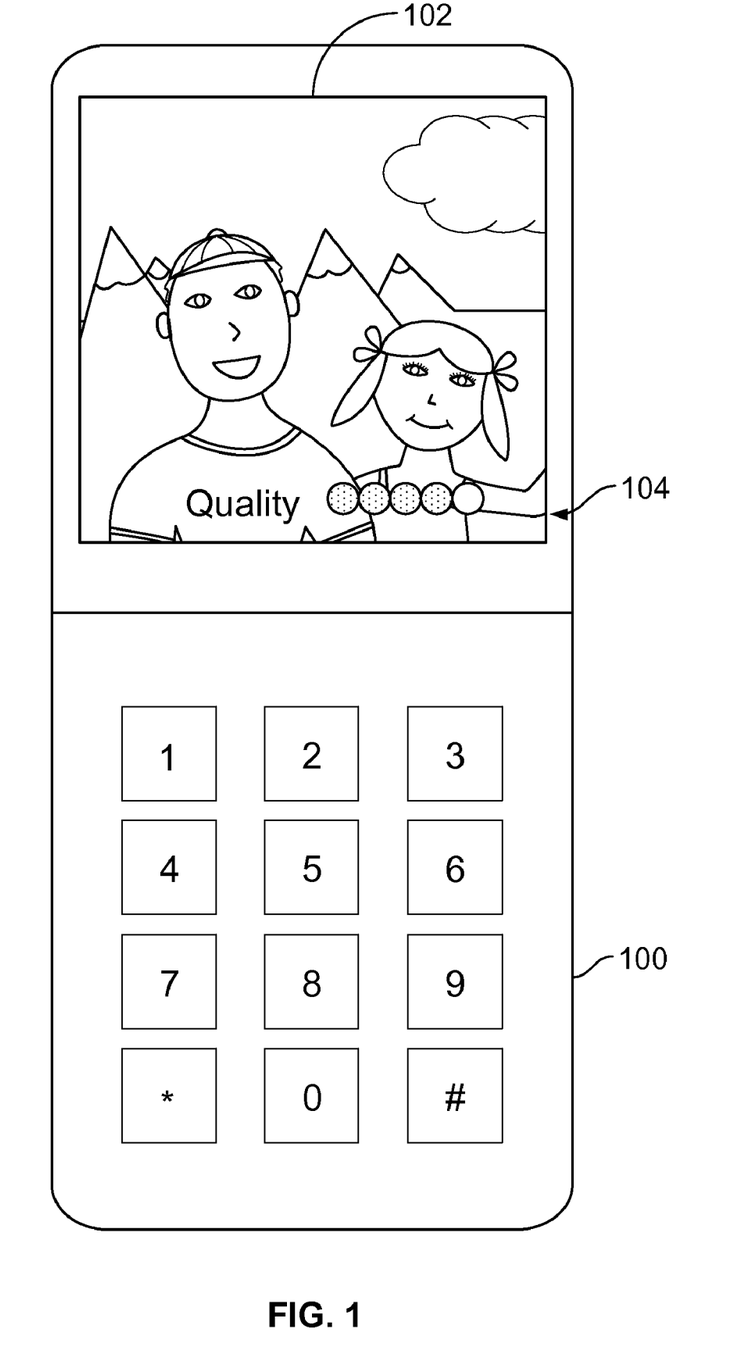
FIG. 1 is a diagram illustrating an embodiment of a mobile telephone configured to display a quality indicator.

FIG. 1 is a diagram illustrating an embodiment of a mobile telephone configured to display a quality indicator. In the example shown, mobile telephone 100 is capable of taking photographs. Screen 102 is shown with an image displayed that was taken using mobile telephone 100. Displayed within screen 102 and on top of the image is quality indicator 104. In this example, quality indicator 104 includes the description, "Quality" and five circles next to the description. Based on the quality of the image displayed, an appropriate number of circles are filled in, zero circles being the lowest quality and five circles being the highest quality. In this example, four circles are filled in and the image is of relatively good quality (i.e., four out of five).

By displaying a quality indicator (e.g., above or near a corresponding image) a user may be able to quickly and/or easily assess the quality of an image. In this example, the size of screen 102 may be, for example, only two or three inches high or wide. Because of the small size and/or low resolution of screen 102, it may be difficult for a user to assess the quality of the displayed image. In some cases, display components in mobile telephone 100 are relatively inexpensive which makes assessing the quality of an image difficult. For example, the smaller screen size of a mobile device may have fewer pixels per inch and/or may have fewer display colors. By displaying a quality indicator above or near an image, a user may be able to assess the quality of an image regardless of the size and/or number of colors displayed by screen 102.

In some embodiments, displaying a quality indicator enables a user to quickly decide whether to take another picture. For example, some events being captured in a photograph cannot be recreated later (e.g., a party, a vacation, meeting a celebrity, etc.) and it is important to the user to have an attractive photograph to later print and/or distribute.

In some embodiments, displaying a quality indicator enables a user to decide which images to delete. For example, a user may take multiple, similar photographs and may want to delete some of those photographs. In some embodiments, a user is able to decide which photographs to delete using a quality indicator displayed over or near an image. For example, mobile telephone 100 may have a limited amount of memory and deleting poor quality photographs would release memory.

In some embodiments, some automatic process is triggered based on a quality measurement or indicator. For example, based on a quality indicator an image may be quickly erased, saved, and/or corrected by an automated process.

In some embodiments, displaying a quality indicator is desirable since an objective value (e.g., generated by some process or function) is used as opposed to a subjective value. For example, some other techniques permit a user to rank or assign a rating to images (e.g., a user assigns an image four out of five stars). However, this value may be a subjective measure or value that depends upon the person. For example, one person may assign a different rank or value than another person even though the same image is evaluated. In some cases, a subjective value is inaccurate, e.g., if the user assigning the subjective value is viewing the image on a small screen, the user's assessment may be inaccurate.

In various embodiments, a quality indicator uses a shape (e.g., a circle, star, bar, check mark, or smiley face), alphanumeric characters, and/or descriptions. In some embodiments, a quality indicator is binary or has two states (e.g., okay or not okay, good or bad, blurry or not blurry, etc.) In some embodiments, some threshold is used. For example, if binary quality values are output, a threshold may be used to define or separate the two quality values. In some embodiments, a quality indicator is capable of displaying values or quantities from a continuous range. For example, some quality indicators include a color display where red indicates high quality, violet indicates poor quality, and any color in the continuous range between red and violet is able to be displayed. In some embodiments, an entire range (e.g., between red and violet) is not necessarily shown. For example, a user-defined or default threshold may be used where any photo above the threshold is automatically saved and any image below the threshold is automatically discarded. In some embodiments, a determination of whether a value is above/below a threshold is translated into or is used by a two-state indicator.

In various embodiments, a quality indicator is associated with an appropriate quality measurement, characteristic, or attribute of an image. Some examples include blurriness/sharpness, color, contrast, brightness, hue, saturation, graininess, shadows, highlights, exposure, etc. In some embodiments, a user is able to configure or specify a quality value or measurement that a quality indicator is associated with. Alternatively, in some embodiments a threshold is learned as opposed to being explicitly specified. For example, a threshold may be learned based on user behavior using a learning process, e.g., that observes and analyzes deleting, sending, saving, editing, etc. on the camera or on a computer. In some embodiments, an image has associated with it two or more quality indicators. For example, mobile telephone 100 may be able to display two quality indicators—one for blurriness and another for brightness—and both quality indicators are displayed at the same time.

In some embodiments, there is a single quality indicator displayed for a plurality of quality (sub) measurements. For example, some systems are configured so a a low quality is indicated if any one of the quality sub-measures (e.g., sharpness, color, etc) is below some threshold. Alternatively, some systems are configured so that an average of the quality across sub-measures of interest is displayed. In some embodiments, a user is able to configure this (e.g., a mode where if one sub-measure is relatively low, a low quality is displayed versus a mode where an average is displayed).

In some embodiments, a quality indicator is associated with a particular part or portion of an image. For example, in some embodiments, a quality indicator is displayed with a zoomed in version of an image (e.g., where certain edges of the complete image are not displayed) or a quality indicator is displayed with a dashed or dotted rectangle, indicating a part or portion that has the indicated quality. In some embodiments, a quality indicator for a portion of an image is implemented by overlaying a layer (e.g., a green-yellow-red transparent layer) on top of an image.

In some embodiments, a quality measurement is saved, for example as metadata with an image, so that the saved information can later be retrieved and used. For example, if an image is transferred to another device or user, it may be possible to display a quality indicator without having the receiving device or user repeat a quality calculation or determination. This may also ensure consistency in the quality indicator.

Although some examples described herein describe photographs, in some embodiments, quality indicators are displayed for images that are not photographs. For example, a quality indicator may be displayed for scanned documents (e.g., so that a user can assess whether scanned text is blurry, whether flecks or other noise were introduced during the scanning process, etc.). In some embodiments, a quality indicator is displayed for an animation frame or other image that is synthesized or otherwise created digitally. In some embodiments, the concepts described herein are used with video. For example, in some embodiments, a quality indicator is displayed for video. In some embodiments, an image is extracted from video (e.g., a frame from a video) and a quality indicator is displayed for the extracted image or a series of video (e.g., whether the video is shaky, low-light, etc.).

Figure 2:
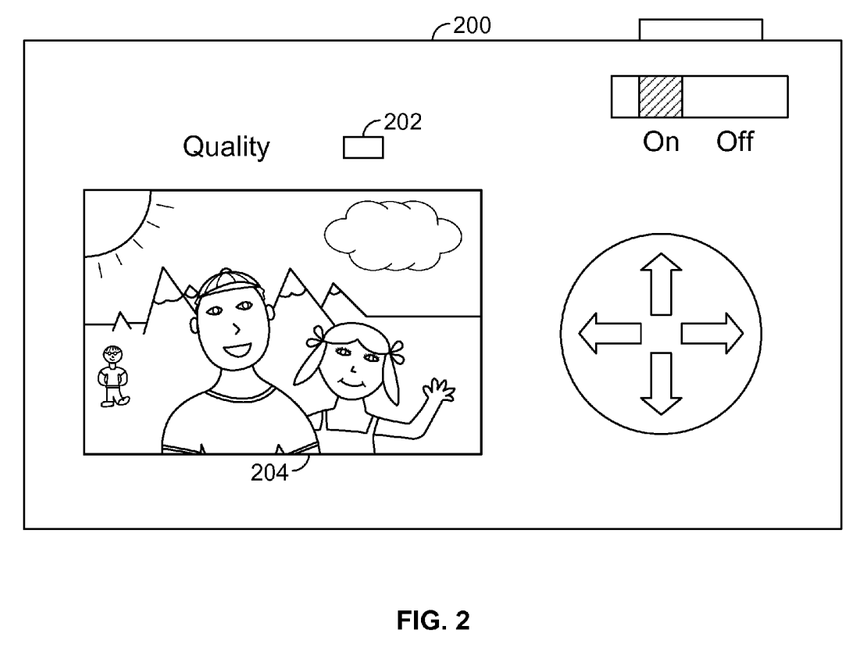
FIG. 2 is a diagram illustrating an embodiment of a digital camera configured to display a quality indicator.

FIG. 2 is a diagram illustrating an embodiment of a digital camera configured to display a quality indicator. In the example shown, a photograph taken using digital camera 200 is displayed in screen 204. The quality of the displayed photograph is indicated using LED 202. In this example, the LED is configured to display a finite number of colors (e.g., red, green, and yellow) and the color displayed by LED 202 indicates the quality of the photograph displayed in screen 204. For example, green may indicate good or high quality, yellow may indicate moderate or acceptable quality, and red may indicate poor or unacceptable quality. In this example, LED 202 is integrated into digital camera 200 and the quality indicator is displayed near or next to a corresponding image. In the example of FIG. 1, no additional or dedicated component is included in mobile telephone 100 to display the quality indicator and the quality indicator in that figure is displayed using screen 104. Any appropriate component may be included in a mobile phone, digital camera, or other device to display a quality indicator.

In some embodiments, a quality value or result is stored so that a quality indicator can later be displayed without having to regenerate the quality value. For example, a user may go through photographs that are stored on digital camera 200 or removable storage associated with it. Rather than regenerating a quality value each time a photograph is displayed, the stored quality value may be retrieved and LED 202 may display an appropriate color. In some embodiments, a stored quality value is associated with an image. For example, the quality value may be stored as metadata with the image. In some embodiments, the quality value is transferred with an image when it is transferred to another device. For example, if an image is downloaded to a computer, the stored quality value may be passed to the computer or other device so that it is able to display a quality indicator immediately and/or without having to repeat a calculation. In some embodiments, this information is used to automatically suggest which images a user should edit. In some embodiments, this information is used as a search criterion to help the user select the best images from a series of similar shots and/or is used to order or arrange the images based on quality.

Figure 3:
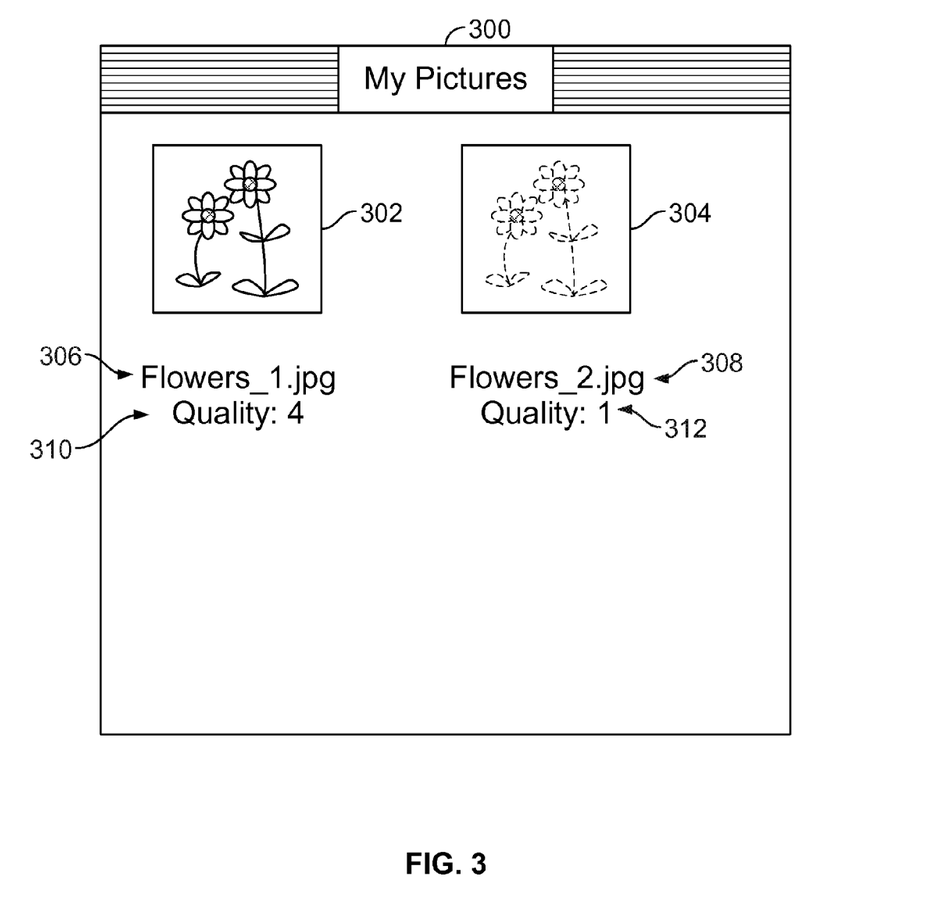
FIG. 3 is a diagram illustrating an embodiment of a file system window that is configured to display a quality indicator.

FIG. 3 is a diagram illustrating an embodiment of a file system window that is configured to display a quality indicator. In the example shown, window 300 is associated with a file system. For example, the two files flowers_1.jpg and flowers_2.jpg may be located in the directory "My Pictures" in some file system. In some embodiments, window 300 is displayed by a computer and is associated with an operating system such as Microsoft Windows or Mac OS. In some embodiments, window 300 is associated with some other device with a file system, such as a personal digital assistant (PDA) or a smart phone.

Thumbnails 302 and 304 are displayed within window 300 and are located above file names 306 and 308 respectively. In some embodiments, thumbnails allow a user to preview the content of an image. In this example, the images flowers_1.jpg and flowers_2.jpg have similar content and both depict two flowers. Below the file names are quality indicators 310 and 312. In this example, flowers_1.jpg has a quality of 4 and flowers_2.jpg has a quality of 1. This is one example of how a quality indicator may be displayed; information may be grouped and/or displayed in any appropriate manner. For example, some windows are configured so that the quality indicator is displayed on a thumbnail.

In some systems, window 300 is able to be resized and may have relatively large dimensions. However, in some systems, the sizes of thumbnails 302 and 304 are fixed and may not necessarily change as window 300 grows/shrinks. As such, the size of thumbnails 302 and 304 may be relatively small and it may be difficult for some users to easily assess the quality of the images. It may be useful to display a quality indicator in a window as shown herein.

In some embodiments, thumbnails 302 and 304 are down-sampled, compressed, or lower resolution versions of their respective images. In some cases, displaying a quality indicator (e.g., quality indicators 310 and 312) is helpful since a displayed version (e.g., thumbnails 302 and 304) may not necessarily be the exact or full version of an image.

In some embodiments, a quality indicator is associated with absolute quality. In some embodiments, a quality indicator is associated with relative quality, for example with respect to a group of images. For example, if relative quality is determined for the example shown, the quality associated with the image on the left (thumbnail 302) may be relatively high since the quality of the image on the right (thumbnail 304) is very blurry and of the two images the one on the left is the best or is much better than the one on right. In some embodiments, a group of images for which relative quality is determined are related or similar pictures. In some embodiments where relative quality is used, the image with the highest quality in the group is assigned the highest quality value (e.g., even though that image may have some imperfections such as over/under exposed, too dark/light, etc.). In some embodiments, the quality associated with one image is scaled based on the quality of another image. In some embodiments, images are ranked and their ranking is displayed. For example, "1" is displayed for image 302 and "2" is displayed for image 304.

In some embodiments, quality values or measurements displayed using quality indicators 310 and 312 are pre-calculated. For example, the quality values of 4 and 1 may have been determined by a digital camera used to take the photographs. In some embodiments, the quality values are calculated by a computer in which window 300 is displayed. For example, after downloading the images to a computer, the computer may have calculated the quality values and displayed them with the thumbnails.

In some embodiments, a collection or group of images for which quality indicators are displayed is associated with an album or an application to organize, tag, store, manipulate, and/or share photographs or other images. For example, in some embodiments, thumbnails 302 and 304 and quality indicators 310 and 312 are displayed in the interface of an application that organizes or manipulates photographs. In some embodiments, scrapbook pages or other documents can be laid out, images can be cropped, color can be adjusted, etc. using such an application. In some embodiments, images are automatically fixed based on quality related information transferred with an image (e.g., that is transferred with an image when imported into a software application, website, etc.) In such embodiments, information as to what exactly is wrong is included (e.g., in the metadata). In some embodiments, a collection of images with quality indicators displayed is presented via a web interface. For example, some web based applications allow users to upload and share photographs or other images. In some embodiments, after uploading a collection of images to a website, quality indicators are displayed for the uploaded images with thumbnails via a web interface (e.g., using an Internet browser application such as Microsoft Internet Explorer or Mozilla Firefox).

As shown in the figures above, a quality indicator may be displayed using a variety of devices and/or interfaces. In some embodiments, a quality indicator is displayed using a capture device, such as a digital camera or a mobile telephone. In some embodiments, a quality indicator is displayed using some other device such as a personal digital assistant (PDA), a smart telephone, a Blackberry, a game console, a kiosk, or any other device capable of capturing, managing, and/or displaying images.

Figure 4:
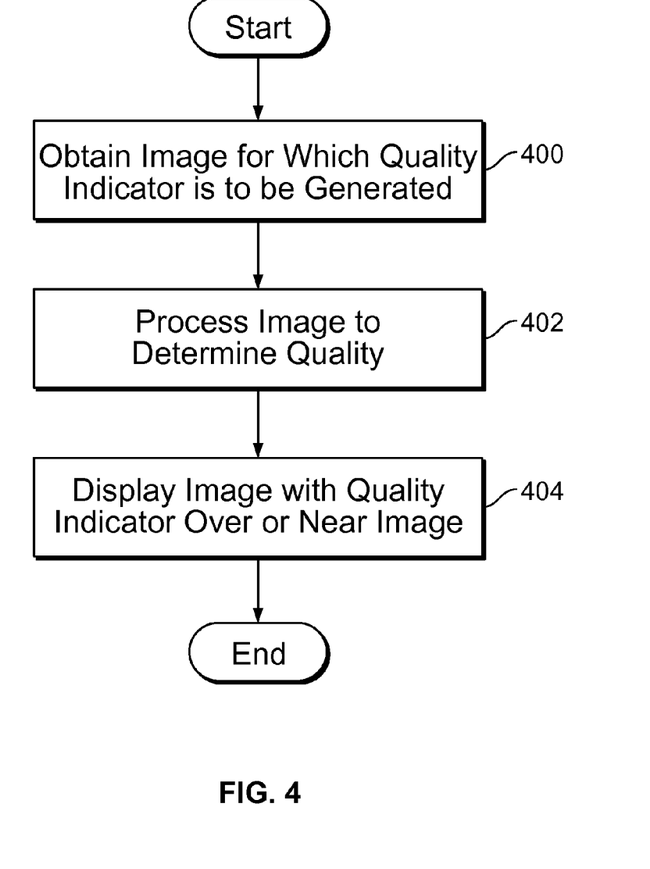
FIG. 4 is a diagram illustrating an embodiment of a process for displaying quality indicators.

FIG. 4 is a diagram illustrating an embodiment of a process for displaying quality indicators. In some embodiments, the example process is performed by a single device. In some embodiments, the example process is performed by two or more devices (e.g., one device determines quality and another device displays the quality indicator). In some embodiments, the steps are performed within a relatively short period of time (e.g., within a fraction of a second after an image is captured and before it is displayed by a capture device).

At 400, an image for which a quality indicator is to be generated is obtained. In some embodiments, an image is obtained immediately after the image is generated or captured. In some embodiments, the image has been generated some time previously and is obtained from memory.

The image is processed to determine quality at 402. In various embodiments, various qualities, results, measurements, or values are output at 402. A variety of analysis techniques, calculations, or measurements may be performed on an image. In some embodiments, spatial frequency analysis is used to determine the quality of an image. For example, an image may be transformed using a Modulation Transfer Function (MTF) and the resulting function may be examined or processed for certain characteristics or indicators associated with quality. For example, sharpness may be characterized by an MTF with a relatively even distribution. Fuzzy or blurry images may be characterized by an MTF mostly in the lower portion of the x-domain. In some embodiments, some other technique is used to generate a quality value. For example, it may be desirable for devices that are battery powered or that have limited processing capabilities to use techniques that are not as processing intensive. In some embodiments (e.g., connected or networked devices), this processing is performed on a server and the results are sent back to the device.

An image is displayed with a quality indicator over or near the image at 404. In some embodiments, a displayed image is relatively small (e.g., a thumbnail and/or on a digital camera screen). In some embodiments, a single image is displayed at a time (e.g., because a screen is small) and an associated quality indicator is displayed with the image. In some embodiments, multiple images are displayed simultaneously and multiple quality indicators are displayed (e.g., each quality indicator next to or below a corresponding image).

In some embodiments, a user is told what is wrong with an image, for example, so the user is able to take better photographs. For example, a user may be told that the lighting of an image is poor and the information presented to the user may include suggested device settings and/or configurations that may improve the quality of the image. In the case of brightness/darkness for example, some interfaces are configured so that if a user asks, the interface tells a user to use flash. In some embodiments, suggestions or other information are not displayed with a quality indicator. For example, a user may access a suggestion by selecting or clicking on the quality indicator, or some other object such as a "More info" button.

In some embodiments, a user has some degree of control over the display of quality indicators. For example, some systems are configured so that a user is able to toggle or advance through quality indicators associated with a particular image. In one example, a first quality value associated with red eye is generated for an image. A second quality value associated with blurriness may also be generated for that same image. In one example, by pressing some combination of keystrokes or a button (e.g., on a camera), a user is able to toggle or advance through four states: no quality indicator displayed, first quality indicator displayed, second quality indicator displayed, or a combination/overall quality indicator is displayed. Any appropriate technique may be used to control the display of quality indicators. For example, in some embodiments, each display state is associated with a unique keystroke combination or selection from a menu (e.g., that is selectable using a mouse, stylus or other input device).

Figure 5A:
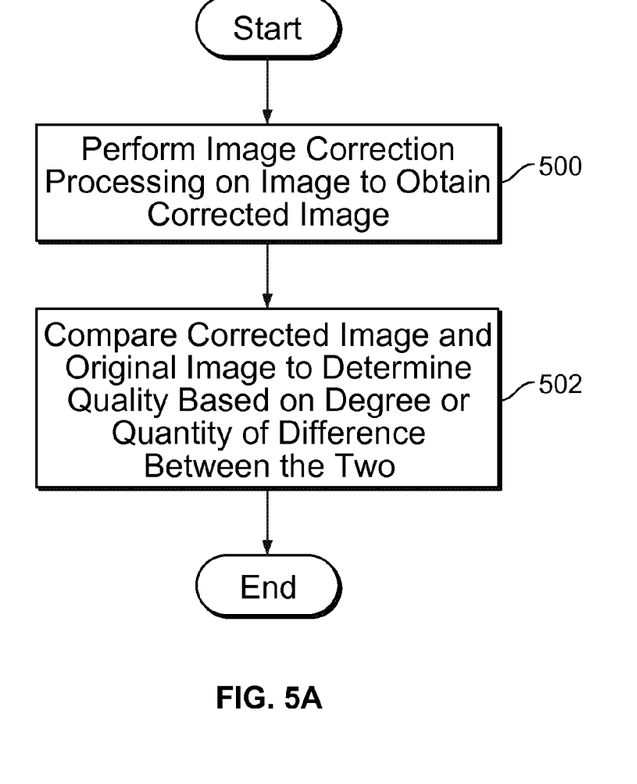
FIG. 5A is a flowchart illustrating an embodiment of a process for determining a quality value or measurement by performing a correction on the image.

FIG. 5A is a flowchart illustrating an embodiment of a process for determining a quality value or measurement by performing a correction on the image. In the example shown, the process may be used at 402 to determine the quality of an image. In some embodiments, some other process is used to determine a quality value or measurement.

At 500, image correction processing is performed on an image to obtain a corrected image. For example, some image editing software applications (such as Adobe® Photoshop®) have semi or fully automated processes to corrected images. In some embodiments, an image is passed to such a software application and image correction processing is performed to obtain a corrected image. In some embodiments, at least a portion of such software is located on a capture device.

In some embodiments, a particular quality measurement is desired and an image correction process is instructed or configured to perform processing associated with that quality measurement. For example, if a quality measurement associated with tilt (i.e., the degree to which a depicted image is not level with a horizontal axis) is desired, in some embodiments a process is directed to correct for tilt. In some embodiments, additional processing is performed, so long as the additional processing does not interfere with or affect a quality calculation process.

At 502, a corrected image and an original image are compared to determine quality based on the degree or quantity of difference between the two. For example, if an image correction process performed at 500 rotated an image to level it out, in some embodiments, the degree or angle of rotation is calculated. In some embodiments, some portions of the image are corrected, and the percentage or fraction of portions that are corrected is calculated. In some embodiments, some transformation is applied to the corrected image and an original image before a comparison is performed. For example, the images may be transformed using a Fourier Transform or a Modulation Transfer Function (MTF) and compared in the frequency domain or the spatial frequency domain, respectively.

In some embodiments, some information or result is saved. For example, although the corrected image in some embodiments is not presented to the user, the user at some point may want the correction to be performed on the image. In some embodiments, a corrected image generated at 500 is saved. This may eliminate the need to perform the correction again later, possibly saving time and/or processing resources. In some embodiments, a decision to save a corrected image is device or resource dependent. For example, devices that are memory limited or have a relatively full memory may decide not to save correction images generated at 500. In some embodiments, saving a corrected image is user configurable or otherwise user controllable.

Figure 5B:
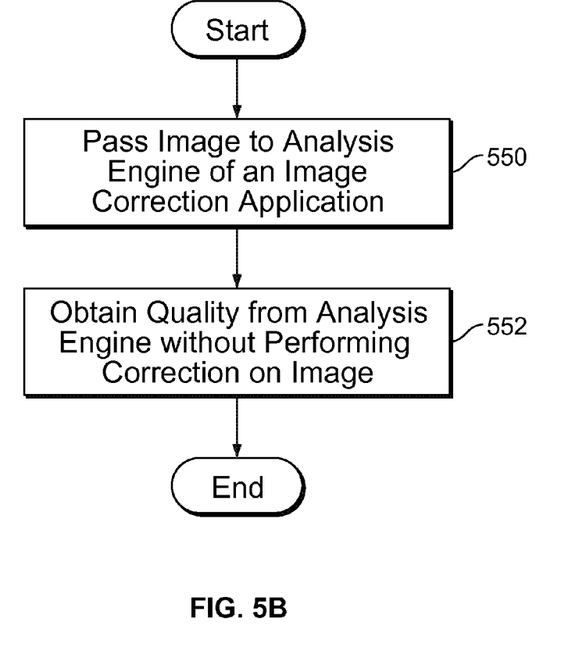
FIG. 5B is a flowchart illustrating an embodiment of a process for using an analysis engine to obtain a quality value or measurement associated with an image.

FIG. 5B is a flowchart illustrating an embodiment of a process for using an analysis engine to obtain a quality measurement associated with an image. In the example shown, a technique for determining the quality of an image is shown and in some embodiments is used at step 402.

At 550, an image is passed to an analysis engine of an image correction application. For example, some image correction applications include an analysis engine to analyze an image and determine what to correct prior to actual correction of the image. In one example, a quality associated with red eye is desired and an image is analyzed by an analysis engine to determine portions of the image that should be corrected for red eye (e.g., oval portions that are reddish and/or located in a face). In some embodiments, an analysis engine used at 500 is associated with or part of an application that corrects or adjusts video. In some embodiments, sub-processes or analysis engines associated with Adobe® Photoshop® (Elements, Lightroom, etc.), Adobe® Premiere® (Elements), Apple iPhoto, Google Picasa, or some other application is used. Alternatively, in some embodiments, an analysis engine used at 500 is not associated with correction or adjustment (e.g., a stand alone application that only analyzes images and does not correct them).

A quality is obtained from an analysis engine without performing a correction on an image at 552. For example, a second or subsequent sub-process that corrects an image may not necessarily be performed. Some analysis engines output a degree or amount of correction to be performed, a portion of an image to be corrected, etc. and a quality associated with an image in some embodiments depends upon such an output.

Any appropriate technique may be used to generate a quality value or measurement; in some embodiments some other technique besides the above examples are used. In various embodiments, a particular technique is selected because of some desired performance or behavior. For example, it may be attractive to use existing applications, processes, or engines (some examples of which are described above) since little or no development effort needs to be spent on them. In some applications, it is desirable to have a quality measurement or value that is very precise and/or accurate; in some cases, the processes described above result in quality values or measurements that are precise and/or accurate to a desired degree. In some applications, some other attribute or performance is desired (e.g., less processing intensive and/or less power intensive) and some other technique is used (e.g., a technique that estimates or approximates a quality value or measurement and is not processing intensive). For example, images with creation times that are very close together (e.g., a fraction of a second or a few seconds apart) may tend to have similar quality. There may not be sufficient time for the lighting conditions to change, for the device settings/configurations to change, and/or for the scene being captured to change. In some embodiments, the same or similar quality measurement is used for images with similar creation times (e.g., without repeating an image quality determination process). In some embodiments, one technique is used to determine one type of quality and another technique is used to determine another type of quality. For example, if quality associated with red eye is desired, in some embodiments, a color matching process is used to detect certain shades or colors of red. If quality associated with blurriness is desired, in some embodiments, the image transformed using a Modulation Transfer Function (MTF) and analyzed.

Figure 6:
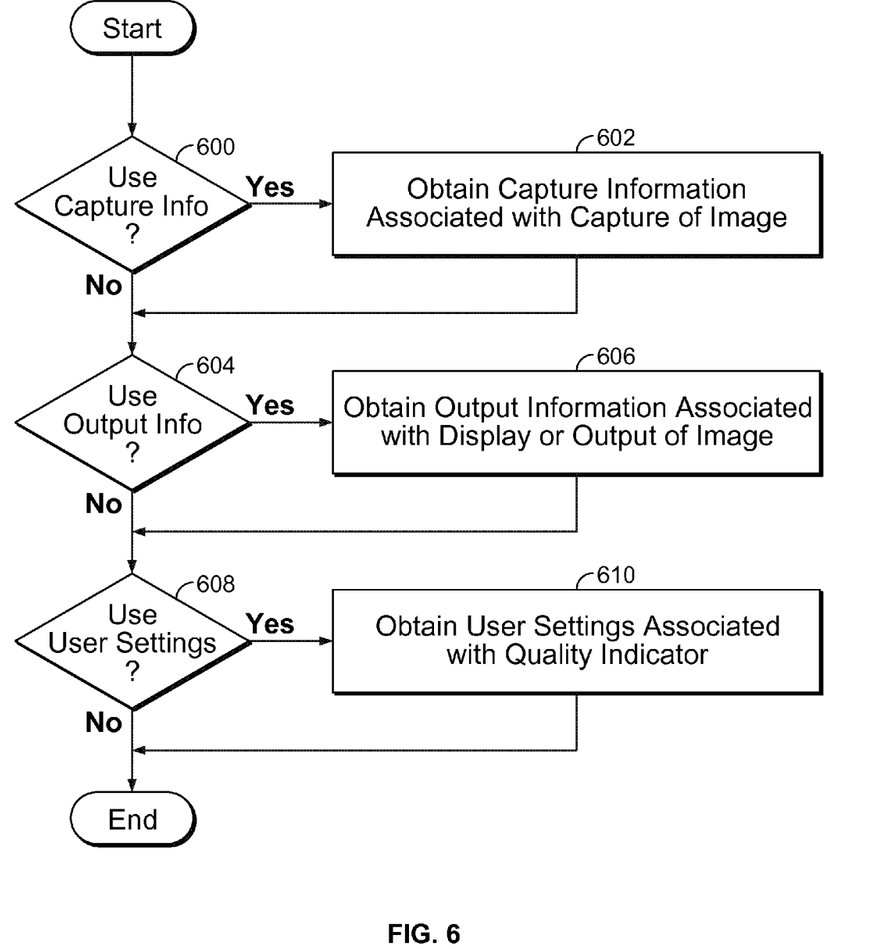
FIG. 6 is a flowchart illustrating an embodiment of a process for obtaining one or more pieces of information used in determining an image's quality.

FIG. 6 is a flowchart illustrating an embodiment of a process for obtaining one or more pieces of information used in determining an image's quality. In the example shown, various pieces of information are optionally obtained and used in determining a quality associated with an image. In some embodiments, the example process is performed prior to determining quality at 402 of FIG. 4.

At 600, it is determined whether capture information is to be used. If so, at 602, capture information associated with the capture of an image is obtained. In various embodiments, capture information is associated with a device, state, setting, or mode associated with the capture of an image. For example, the capabilities or other information about a capture device, such as a digital camera or a mobile telephone, may be used in determining quality. A mobile telephone may, for example, have less expensive components or less features compared to a digital camera (e.g., a digital camera may have a feature that compensates for shaking, may have a red eye reduction flash mode, may have a better lens, etc. compared to a mobile telephone). Similarly, one digital camera may have different features or performance compared to another camera (e.g., a SLR camera versus a disposable camera). In some embodiments, determining a quality takes into consideration information associated with a capture device. For example, the quality of a particular image may be poor but the capture device used may have been an inexpensive device and the image is the best possible.

In some embodiments, a state or condition associated with capture is used in determining quality. For example, the lighting conditions at the time an image is captured may be used. In some embodiments, a capture device has features or capabilities associated with motion stabilization (e.g., some digital cameras include a gyroscope) and information associated with movement is obtained at 602. In some embodiments, certain states or conditions tend to be associated with poor quality images (e.g., poor lighting conditions, movement when an image is being captured, etc.) and lighting, movement, or other state/condition information is used to approximate, calculate, or otherwise determine a quality of an image.

In some embodiments, a setting or configuration associated with capture of an image is used. For example, some digital cameras have configurable flash modes, such as no flash, automatic flash, forced flash, and red eye reduction flash. In some embodiments, a setting associated with focus, distance, or depth of field is used. In some embodiments, a setting associated with shutter speed or a length of exposure is used. In some embodiments, this information is used to estimate or determine a quality of an image. For example, if the quality is associated with blurriness, shutter speed or a focus setting may affect or otherwise be associated with the blurriness of an image.

At 604, it is determined whether to use output information. If so, at 606, output information associated with display or output of an image is obtained. As an example of how output information is used, a standard or determination of quality is more rigorous in some embodiments if the image will be displayed (e.g., via a monitor) or output (e.g., printed) with large dimensions. For example, the quality of an image may be sufficient to print it out as a 4 inch by 6 inch picture, but the quality may not necessarily be sufficient to print it out as a 4 foot by 6 foot poster and accordingly the quality in some embodiments varies based on how an image is intended to be output.

It is determined at 608 whether to use user settings. If so, user settings associated with a quality indicator are obtained at 610. In some embodiments, user settings describe or include what quality characteristics or values are to be determined. In some embodiments, user settings include a threshold or some standard. For example, if a binary or two state quality indicator is to be displayed (e.g., acceptable or not acceptable) then in some cases a user setting includes a threshold that separates the two states.

Figure 7:
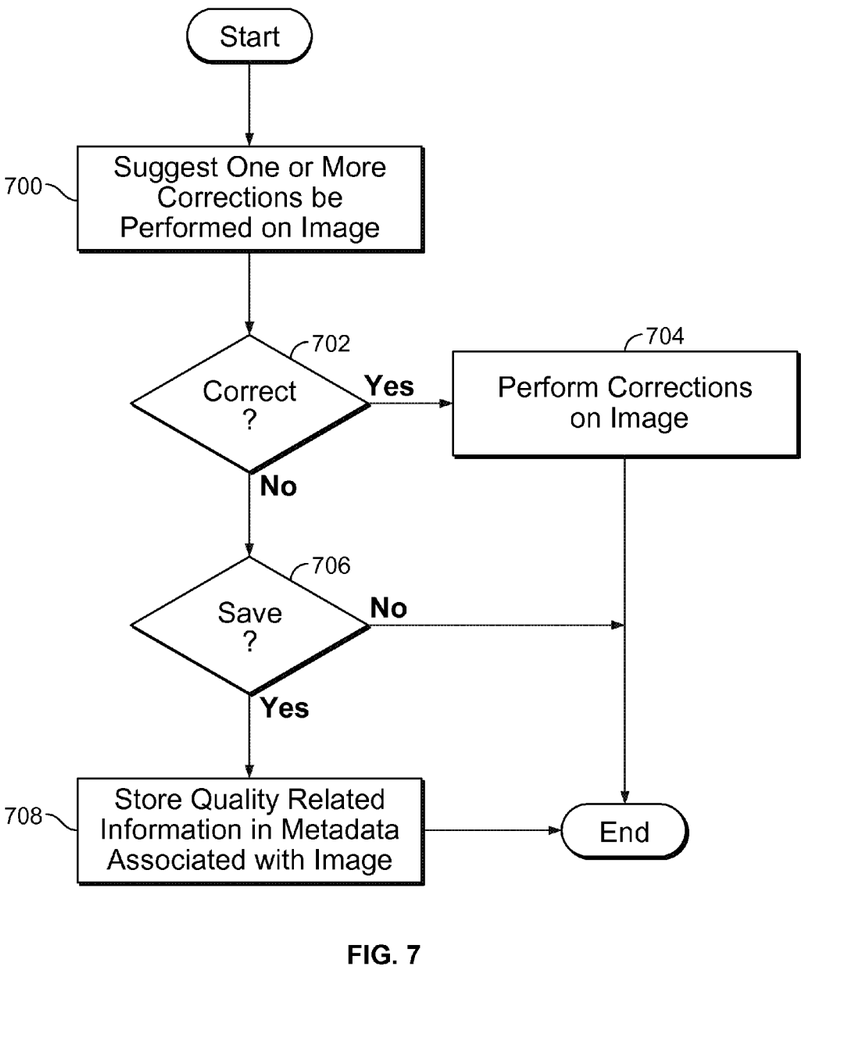
FIG. 7 is a flowchart illustrating an embodiment of a process performed after displaying a quality indicator.

FIG. 7 is a flowchart illustrating an embodiment of a process performed after displaying a quality indicator. In the example shown, suggestions are presented to a user, for example with or after displaying quality indicators. In some embodiments, a single image is displayed at a time and a suggestion is associated with the image currently being displayed. For example, some digital cameras and mobile telephones have relatively small displays where it is desirable to only display a single image at a time. In some applications, multiple images are displayed (e.g., a window that displays thumbnails of images in a directory of a file system) and suggestions are associated with one or more of those displayed images.

At 700, one or more corrections are suggested to be performed on an image. It is determined at 702 whether to correct an image. For example, the user may send back an indication to correct an image or to not correct an image. If an image is to be corrected, at 704 corrections are performed on an image. In some embodiments, an image is corrected ahead of time and stored in the event a user wants to correct the image and a pre-corrected image is retrieved. In some embodiments, a pre-corrected image is not available.

If a correction is not to be performed, it is determined at 706 whether to save quality related information. If so, quality related information is stored in metadata associated with the image at 708. In some embodiments, metadata is information associated with an image that is not related to the visual content of the image. In some embodiments, metadata is stored in an image file (e.g., along with visual content) so that if an image file is passed or transferred to another device or user the metadata goes with the visual content. In some embodiments, a quality value or measurement is stored so that a quality indicator can later be displayed (e.g., on another device) without having to recalculate or re-estimate a quality value or measurement. In some embodiments, some information that can (if so desired) be used by a correction process is stored. For example, the portion(s) of an image where people's eyes are reddish may be stored in metadata to be later retrieved by a red eye correction process.

In some embodiments, some other action or process is performed after displaying a quality indicator (e.g., that is not necessarily associated with correction). For example, in some embodiments quality indicators are displayed for a collection of images that are similar to each other. In some embodiments, deletion of one or more poor(er) quality images in the collection is suggested to the user. In some embodiments, a user wants to share an image and an image is sent to another device or user. For example, if an image is taken using a mobile telephone, in some embodiments, the image is sent out to one or more other devices or users using a mobile telephone network (e.g., an EDGE network or a 3G network). In some embodiments, sharing is performed automatically. For example, a user may configure his device to automatically share images that are above a certain quality. In some embodiments, a user is asked if he would like share an image before that image is sent.

Figure 8:
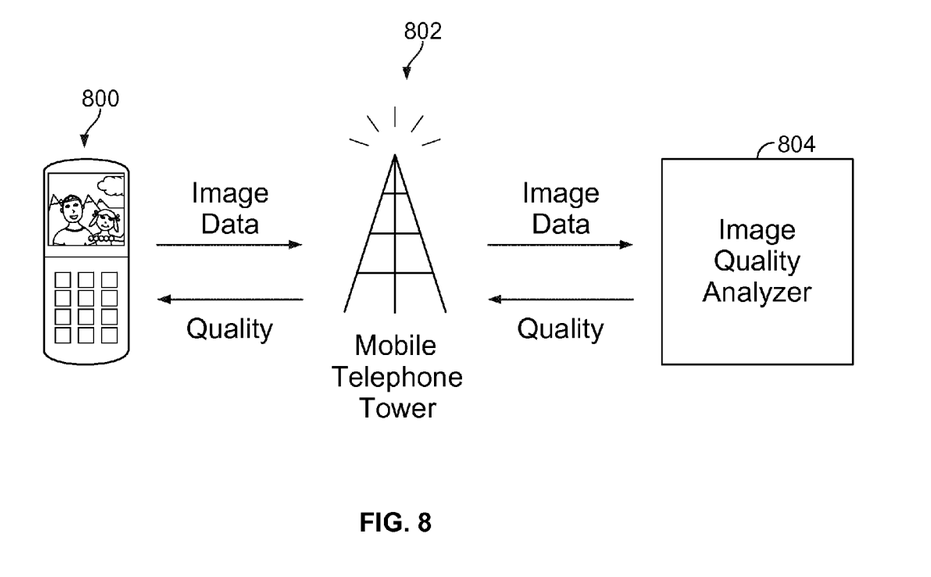
FIG. 8 is a diagram illustrating an embodiment in which quality determination is offloaded to a remote image quality analyzer.

FIG. 8 is a diagram illustrating an embodiment in which quality determination is offloaded to a remote image quality analyzer. In this example, a quality indicator is displayed by mobile telephone 800 and the quality of the image is determined by image quality analyzer 804. Using mobile telephone 800, an image is captured and image data is passed from mobile telephone 800 to mobile telephone tower 802. A variety of mobile telephone technologies, networks, or communication techniques may be used. For example, in some embodiments, an EDGE network is used to exchange image data. In some embodiments, image data passed between mobile telephone 800 and mobile telephone tower 802 includes an image file, such as a JPEG file associated with the image. In some embodiments, image data includes down sampled or compressed information and quality is determined using down sampled, compressed, a portion of, or other representative information.

Image data is passed from mobile telephone tower 802 to image quality analyzer 804. A quality is output by image quality analyzer 804 and is passed to mobile telephone 800 via mobile telephone tower 802. Mobile telephone 800 in this example uses the quality value passed to it to display a quality indicator on top of or near the image.

In various embodiments, an image quality analyzer comprises a variety of physical and/or logical components. In some embodiments, image quality analyzer 804 includes a computer with an application or process running on it that is configured to process images and output quality values or measurements. In some embodiments, image quality analyzer 804 includes other components to, for example, communicate, store, and/or manage information. For example, some image quality analyzers are configured to service multiple devices (e.g., many mobile telephones) and in some embodiments an image quality analyzer includes memory for buffering image data if image quality analyzer 804 is processing other image data. In some embodiments, image quality analyzer 804 includes an appropriate interface for communicating with mobile telephone tower 804. In some embodiments, information is passed via some intermediary network or device and image quality analyzer 804 includes some interface for communicating with that network or device.

In some applications, offloading determination of quality to another device is attractive because some resource is conserved. For example, mobile telephone 800 may be battery powered, may have limited processing capabilities, and/or may have a limited amount of memory to store or run applications, instructions, or executables to determine quality. Processing an image to determine a quality value or measurement may use a non-trivial amount of resources (e.g., power, processing, and/or memory) and it may be desirable to have some other device besides mobile telephone 800 perform this processing. In some embodiments, a particular software application is used and that application has a purchase price and/or a licensing fee associated with it. By running an application at image quality analyzer 804 it may be possible to keep prices and/or fees down.

In some embodiments, additional information is passed to image quality analyzer 804 such as settings, configurations, or commands. For example, some device may have a quality range of 0-5 while others have a quality range of 0-10; in some embodiments a maximum quality or quality range is sent to an image quality analyzer. In some embodiments, some threshold or standard is passed to an image quality analyzer. Some examples of information that may be used in determining quality (and which in some embodiments are passed to image quality analyzer 804) are described in FIG. 6.

In some embodiments, some processing is performed at image quality analyzer 804 and some processing is performed at mobile telephone 800. For example, a limited amount of processing may be performed at mobile telephone 800, such as comparing a quality value against a threshold in the case of a binary quality indicator. In some embodiments, processing related to user settings is performed at mobile telephone 800. For example, raw quality value(s) may be sent to mobile telephone 800, which determines based on user settings which quality indicator to display.

Figure 9:
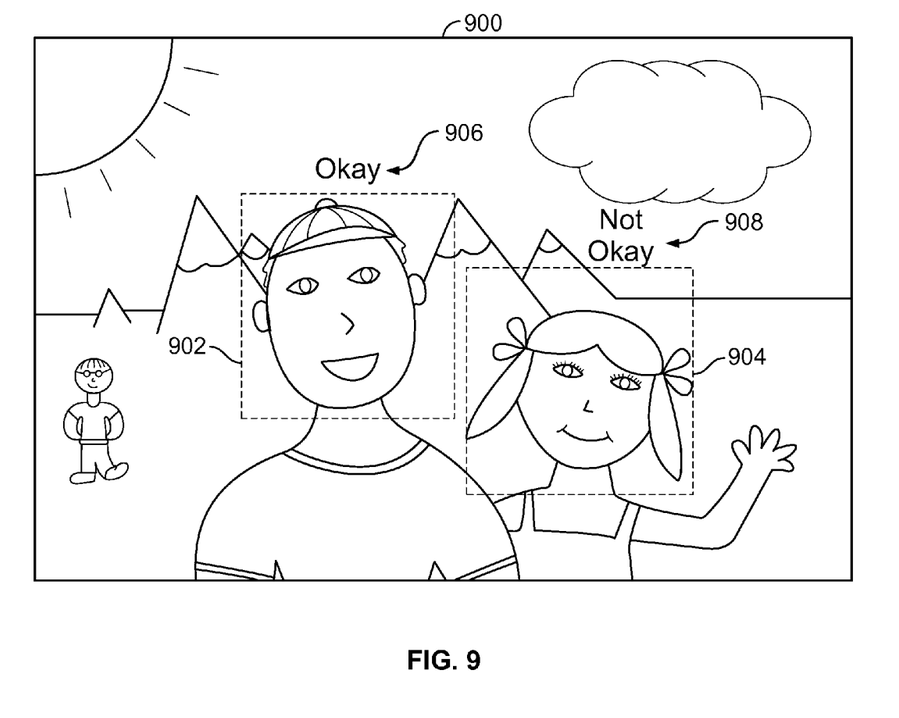
FIG. 9 is a diagram illustrating an embodiment in which a quality indicator is associated with a portion of an image.

FIG. 9 is a diagram illustrating an embodiment in which a quality indicator is associated with a portion of an image. In the example shown, quality indicators 906 and 908 are associated with portions 902 and 904 of image 900, respectively. In this example, the quality indicators are configured to output either "okay" or "not okay" based on, for example, some standard or threshold associated with a particular quality of an associated portion. Quality indicator 906 displays "Okay" and quality indicator 908 displays "not okay."

In some cases, a user may care about a certain portion of an image and a quality indicator that is associated with that portion may be displayed. For example, a user may be looking for a headshot to post on a dating website and may want an image that is not blurry and/or does not have red eye. The user in that example may not necessarily care about the rest of the image, since only the head portion will be displayed or used.

In some embodiments, displaying a quality indicator for a portion of an image is similar to displaying a quality indictor for an entire image, except a portion of an image is processed to determine quality rather than an entire image. For example, a first quality value or measurement is determined for portion 902. In some embodiments, parts of image 900 that are outside of or otherwise not included in portion 902 are not used in the calculation. For example, the part of image 900 that is not included in portion 902 may be out of focus or blurry but portion 902 may be acceptable and quality indicator 906 indicates this.

In various embodiments, a portion of an image for which a quality indicator is displayed is indicated, determined, or otherwise obtained in a variety of ways. In some embodiments, a portion is indicated or determined by a user. For example, a user may use a mouse, stylus, or other input device to draw two rectangles over image 900, resulting in portions 902 and 904. In other embodiments, some automated process detects or determines a portion for which a quality indicator is displayed. In this example, portions 902 and 904 are associated with faces; in some embodiments, a face detection process is used to obtain portions 902 and 904 automatically. In some embodiments, some other portion is desired (e.g., a portion that depicts a car, a portion that includes a certain color such as red, a portion that includes a focal point, etc.) and an appropriate detection process is used.

In some embodiments, image 900 is displayed relatively small in size, such as on a digital camera screen or as a thumbnail. In such embodiments, quality indicators 906 and 908 may be displayed larger in size or in a different way (e.g., an "X" over a blurry face).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method comprising:
obtaining an image, captured on a mobile telephone which includes a camera, for which a first quality indicator and a second quality indicator are to be displayed;
obtaining information associated with a first portion of the image and a second portion of the image;
sending, via a mobile telephone network, the obtained information associated with the first portion of the image and the second portion of the image to a remote image quality analyzer;
using a processor, on the remote image quality analyzer, to generate a corrected version of the image prior to receiving any indication associated with correcting the image at the remote image quality analyzer;
receiving, from the remote image quality analyzer and via the mobile telephone network, the corrected version of the image in the event a request associated with correcting the image is received; and
displaying, on the mobile telephone, the corrected version of the image.

2. A method as recited in claim 1, wherein a plurality of quality indicators are displayed for a plurality of images.

3. A method as recited in claim 1, wherein the first quality indicator and/or the second quality indicator is/are displayed on top of the image.

4. A method as recited in claim 1, wherein displaying the first quality indicator and the second quality indicator includes one or more of the following:
displaying via a capture device, displaying via a mobile telephone, or displaying via a computer.

5. A method as recited in claim 1, wherein a first quality value and/or a second quality value is/are associated with relative quality.

6. A method as recited in claim 1, wherein a first quality value and/or a second quality value is/are associated with absolute quality.

7. A method as recited in claim 1, wherein the first portion of the image and the second portion of the image do not overlap in the image.

8. A method as recited in claim 1, wherein the first portion of the image and/or the second portion of the image include(s) a face.

9. A system comprising:
an interface configured to:
obtain an image, captured on a mobile telephone which includes a camera, for which a first quality indicator and second quality indicator are to be displayed;
obtain information associated with a first portion of the image and a second portion of the image;
send, via a mobile telephone network, the obtained information associated with the first portion of the image and the second portion of the image to a remote image quality analyzer; and
a processor, on the remote image quality analyzer, configured to generate a corrected version of the image prior to receiving any indication associated with correcting the image at the remote image quality analyzer; and to send, from the remote image quality analyzer and via the mobile telephone network to the mobile telephone, the corrected version of the image in the event a request associated with correcting the image is received; and
a display configured to display, on the mobile telephone, the corrected version of the image.

10. A system as recited in claim 9, wherein the processor is located remotely from the display.

11. A system as recited in claim 9, wherein the system includes a camera.

12. A system as recited in claim 9, wherein displaying the first quality indicator and the second quality indicator includes displaying a number.

13. A system as recited in claim 9, wherein displaying the first quality indicator and the second quality indicator includes filling in zero or more shapes.

14. A system as recited in claim 9, wherein the first portion of the image and the second portion of the image do not overlap in the image.

15. A system as recited in claim 9, wherein the first portion of the image and/or the second portion of the image include(s) a face.

16. A computer program product, the computer program product being embodied in a computer readable, non-transitory storage medium and comprising computer instructions for:
obtaining an image, captured on a mobile telephone which includes a camera, for which a first quality indicator and a second quality indicator are to be displayed;
obtaining information associated with a first portion of the image and a second portion of the image;
sending, via a mobile telephone network, the obtained information associated with the first portion of the image and the second portion of the image to a remote image quality analyzer;
generating, at the remote image quality analyzer, a corrected version of the image prior to receiving any indication associated with correcting the image at the remote image quality analyzer;
receiving, from the remote image quality analyzer and via the mobile telephone network, the corrected version of the image in the event a request associated with correcting the image is received; and
displaying, on the mobile telephone, the corrected version of the image.

17. A computer program product as recited in claim 16, wherein the computer instructions for displaying the first quality indicator and the second quality indicator include computer instructions for displaying a number.

18. A computer program product as recited in claim 16, wherein the computer instructions for displaying the first quality indicator and the second quality indicator include computer instructions for filling in zero or more shapes.

19. A computer program product as recited in claim 16, wherein the first portion of the image and the second portion of the image do not overlap in the image.

20. A computer program product as recited in claim 16, wherein the first portion of the image and/or the second portion of the image include(s) a face.

* * * * *